July 28, 1964 J. R. DE BOER 3,142,264
PANEL MOUNTED TIE-DOWN TERMINALS
Filed Feb. 16, 1962
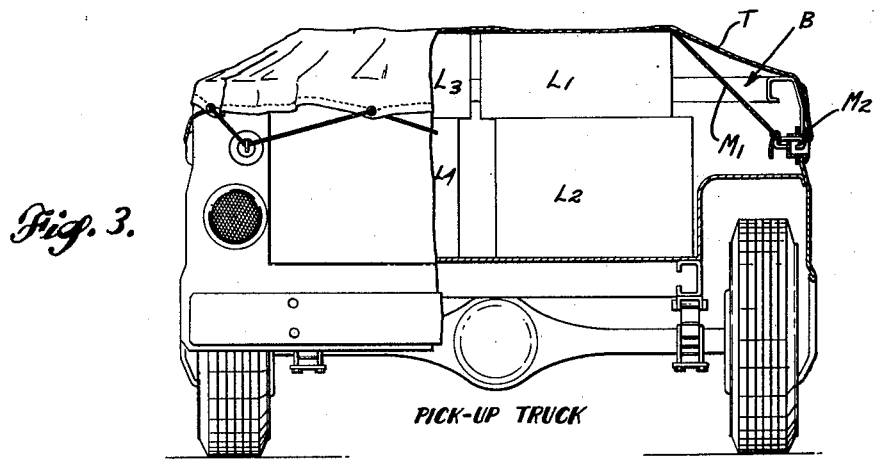
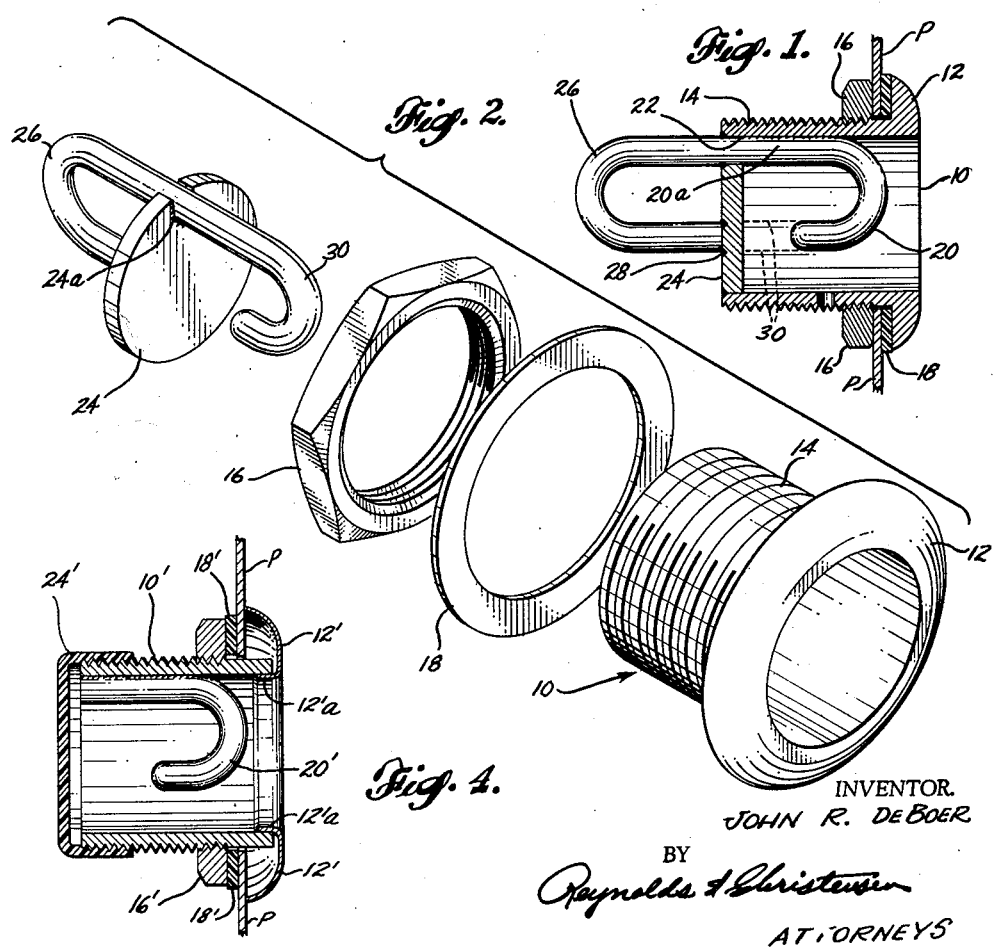
INVENTOR.
JOHN R. DE BOER
BY
Reynolds & Christensen
ATTORNEYS

United States Patent Office 3,142,264
Patented July 28, 1964

3,142,264
PANEL MOUNTED TIE-DOWN TERMINALS
John R. De Boer, Rte. 1, Box 1151, Issaquah, Wash.
Filed Feb. 16, 1962, Ser. No. 173,665
9 Claims. (Cl. 105—369)

This invention relates to new and improved devices for securing a line or fastener at a desired point along a panel such as the side of a truck, automobile or boat hull, for example. The invention is herein illustratively described by reference to the presently preferred embodiment and application thereof; however, it will be recognized that certain modifications and changes therein with respect to details may be made and that other applications may be employed without departing from the essential features involved.

The invention is particularly useful as a means to secure lashing lines which hold the marginal edges of a tarpaulin or other load cover around the box of a pickup truck, for example. A related object is to provide such a tie-down terminal which may be conveniently mounted in and upon a sheet metal panel, with the principal element of the terminal safely recessed yet conveniently accessible for use.

Still another object is to provide such a tie-down terminal which includes not only an element to secure a lashing line from the exterior side of the panel, but which may also include a further element accessible from the opposite side of the panel to secure auxiliary lashing lines. Thus with devices of this nature mounted at spaced locations around the periphery of a truck box, a cover tarp may be tied in place overlapping the edges of the box in order to seal the interior of the box effectively against entry of water and dust, while load objects within the box may be secured with separate lines independent of the cover tarp and of tension in the tarp lines. As a result the cover tarp may be removed and replaced without affecting the load lashings. The load lashings, in turn, protect the tarp against damage caused by shifting load objects especially if they present sharp edges or corners.

A further object is to provide a device of this character which is sealed so that dust and moisture cannot penetrate through the mounting aperture in the sheet panel in which it is installed.

Related objects include the provision of such a device which is durable and rugged, which may be manufactured at relatively low cost, and which may be quickly and inexpensively installed at any of various suitable locations in a wall panel, whether in boats, wheeled vehicles, or other applications.

A further object is a device of this character which may be installed in a panel having a plain round aperture formed therein, which will not materially weaken even a light-gauge sheet metal panel, and which when installed is capable of assuming relatively heavy loads and of distributing those loads to the panel in such a manner as to avoid buckling and undue stress concentration therein.

In accordance with this invention as herein disclosed in its preferred form, the panel-mounted tie-down terminal device comprises an externally threaded tubular housing which extends through an aperture in the panel and which is held therein by a stop collar carried by the outer end of the housing and bearing against the exterior face of the panel, and by an annular stop or collar threaded upon the exterior of the housing to bear against the interior face of the panel, thus to clamp the panel between the two collars under uniform pressure. A hook or equivalent terminal element is mounted within the housing at a location accessible from but recessed within the outer end thereof. As a further feature, the opening through the housing is closed against passage of moisture and dust and an auxiliary fastening terminal element is carried by the end of the tubular housing which projects beyond the inside face of the panel, such that a separate load line may be secured thereto independently of a line, such as a tarp line, secured to the outwardly presented terminal element.

These and other features, objects and advantages of the invention will become more fully evident from the following description thereof by reference to the accompanying drawings.

FIGURE 1 is a longitudinal sectional view of the tie-down terminal in its preferred embodiment as installed upon a panel shown fragmentarily in the view.

FIGURE 2 is an exploded isometric view of the tie-down terminal device.

FIGURE 3 is a rear view of a pickup truck in which a group of these devices have been installed as a means to secure a load within the truck box and to secure a cover over the load and the edges of the box as well.

FIGURE 4 is a longitudinal sectional view of a modified embodiment installed in a panel.

Referring to the drawings, in FIGURE 1 the apertured panel P receives the elongated tubular housing 10 carrying at one end the annular stop collar 12. This housing is exteriorly threaded over at least part of its shank portion, as indicated at 14. An opposing stop collar 16 is threaded onto the exterior of the housing 10 in order to clamp the panel P between the collars 12 and 16, preferably with a rubber or other compressible gasket 18 interposed between the exterior face of the panel and the inside face of the collar 12 as a seal and as a means to maintain pressure against the clamp elements to forestall loosening of the threaded collar 16 under vibrational action.

Within the interior of housing 10, a hook-like terminal element 20 is installed as by welding its shank portion 20a to the inside wall of the housing parallel to the line of contact 22 therewith. A closure plug 24 preferably seals the inner end of the housing against passage of dirt or moisture through the housing.

Preferably a looped fastener element 26 is formed on the projecting inner end of the tubular housing 10 as an auxiliary tie fastener element. The terminal end of the loop may be welded to the closure plug 24, as indicated at 28. The element 26 and the hook 20 may be formed from a single piece of rod stock as shown. The terminal element 20 may be formed as a loop similar to the loop 26, as designated by the dotted lines 30, although when formed as a hook with its free end spaced from the interior face of the plug 24, as preferred, it is more conveniently accessible for looping a line through the element. This factor serves the user's convenience, yet recessed or set back within the open end of the housing 10, such an element will not present a hindrance or a hazard to persons or objects outside the vehicle.

The parts subassembled, as shown in FIGURE 2, comprise the flanged and exteriorly threaded housing 10, the sealing gasket 18, the interiorly threaded stop collar 16 formed as a hexagonal nut which may be conveniently applied and tightened with a wrench, and the plug or cap 24 notched at 24a, with the shank portion of the integral one-piece tie fastener element lodged in the notch and welded to the plug around the edge of the notch as shown. If desired, the plug 24 may be exteriorly threaded and the interior of the housing 10 may be threaded to receive the threaded plug. This avoids any necessity for soldering or welding the plug 24 into the housing interior and makes the plug removable for special situations in which a pass opening (through housing 10) is desired. With the piece 20, 26 integral with the plug 24 welding at 22 inside the housing may be avoided.

For most applications the stop collar or flange 12, which is preferably carried directly on the exterior end of the tubular housing 10, is relatively thin as measured in a direction parallel to the axis of the tubular housing. Thus, even though a gasket 18 is interposed between the back side of this collar and the adjacent face of panel P, the end of the housing does not project unduly beyond the outer face of the panel. In the application shown in FIGURE 3 the outer panel face represents the exterior face of the side panel of a pickup truck box B.

The housing may be made in any of different lengths, of course, and depending upon the length thereof the amount of projection into the interior of the pickup truck box will be determined. With several such devices installed in the side and end panels of the box of such a truck, it is conveniently possible to lash the load objects $L_1$, $L_2$, $L_3$, etc. by use of the interiorly presented loops 26 as tie fasteners for lashing lines $M_1$. At the same time, the recessed terminal elements 20 of these devices may be used to secure lines $M_2$ by which a tarpaulin T may be lashed in place covering the load and also the box as a whole. Such a convenient means of lashing the tarp and the load independently of each other has advantages, particularly when it is desired to remove the tarp without loosening the load. Moreover, heavier lines are usually required to secure the load in place than are required merely to secure a tarp in place as a cover. This avoids the necessity of using the tarp as a load retainer as well as a cover and reduces the danger of holes being punched in it as by the corners of boxes and other sharp-edged load elements.

In FIGURE 4 the modified embodiment is of somewhat less expenisve construction, involving as it does the formed sheet metal stop collar 12' having an inturned flange portion 12'a which is welded or otherwise rigidly joined to the inside rim of the tubular housing 10', and having an end closure which comprises the interiorly threaded thermoplastic flanged cap 24', which replaces the metal plug 24 shown in the preceding embodiment. In this instance the gasket 18' is interposed between the threaded stop collar 16' and the inside face of the panel P, although it would be possible by modifying the shape of the exterior flange collar 12' to form a bearing face thereon which is presented directly to the exterior face of the panel P surrounding the aperture in order to accommodate the sealing gasket between these two faces.

In this instance also the interiorly presented fastener loop 26, shown in the preceding embodiment, is no longer employed but the hook 20' terminates at the end of its shank portion which conveniently extends only to the interior end of the tubular housing 10'. The thermoplastic cap 24' may be conveniently removed when it is desired to extend a line through the tubular housing 10' in lieu of or in addition to fastening a line around the hook 20', thereby increasing the versatility of the unit.

With the unit removed from the panel P the panel aperture may simply be closed or covered by a snap-in plug or a circular plate having clips or other fastening means thereon. This may be done, for example, when the full width of the box interior is needed and even the small amount of projection of the terminal unit into the box interior cannot be permitted. However, removal and replacement of the unit is simple and quickly accomplished so that no problem is presented by such requirements.

It will be recognized that devices of this nature may be employed not only in the side panels of pickup truck boxes but also in the side panels of truck and automobile fenders, doors, cab bodies, as well as in the hulls or cabin walls of boats and various other vehicles or other structures generally. These and other aspects of the invention, including variations upon the detailed embodiments depicted in the drawings and described hereinabove, will be evident to those skilled in the art based upon the foregoing description of the presently preferred practices thereof.

I claim as my invention:

1. A panel-mounted tie-down terminal device, comprising, in combination with a sheet panel having an aperture, an externally threaded tubular housing substantially longer than the panel thickness, extending through said aperture, annular means carried at one end of the housing and abutting one side of the panel adjacent the aperture, annular stop means including an element removably threaded upon the housing, said stop means being abutted to the opposite side of said panel adjacent the aperture thereby to hold the housing in said aperture, and terminal means mounted within said housing and comprising a tie fastener element extending transversely in the housing adjacent the first-mentioned end thereof.

2. A panel-mounted tie-down terminal device, comprising, in combination with a sheet panel having an aperture, a tubular housing substantially longer than the panel thickness, extending through said aperture, annular means carried at one end of the housing and abutting one side of the panel adjacent the aperture, annular stop means, said stop means and said housing having mutually engageable and disengageable holding means operable to hold said stop means abutted to the opposite side of said panel adjacent the aperture thereby to hold the housing in said aperture, and terminal means mounted within said housing and comprising a tie fastener element extending transversely in the housing adjacent the first-mentioned end thereof.

3. The device defined in claim 2, means closing the opposite end of the housing, and a second tie fastener element carried by and accessible exteriorly at said opposite end of the housing.

4. The device defined in claim 3, wherein the first-mentioned fastener element comprises a hook-like element substantially recessed back within the first-mentioned end of the housing.

5. A panel-mounted tie-down terminal adapted for mounting in a sheet panel having an aperture, a tubular housing substantially longer than the panel thickness, extending through said aperture, an annular stop collar carried by one end of the housing and adapted to abut one side of the panel adjacent the aperture, stop means, said stop means and said housing having mutually engageable and disengageable holding means operable to hold said stop means abutted to the opposite side of said panel adjacent the aperture thereby to hold the housing in said aperture, and terminal means mounted within said housing and comprising a tie fastener element extending transversely in the housing adjacent the first-mentioned end thereof.

6. The device defined in claim 5, means closing the opposite end of the housing, and a second tie fastener element carried by and accessible exteriorly at said opposite end of the housing.

7. The device defined in claim 5, wherein the stop means comprises an annular collar threaded upon the housing, the first-mentioned fastener element comprises an element forming at least a partial loop within the housing, and the second-mentioned fastener element forms at least a partial loop at said opposite end of the housing.

8. The device defined in claim 2, means removably mounted upon and closing the end of the housing opposite the end thereof first mentioned.

9. The device defined in claim 5, means removably mounted upon and closing the end of the housing opposite the end thereof first mentioned.

References Cited in the file of this patent

UNITED STATES PATENTS

| | | |
|---|---|---|
| 1,321,742 | Hendricks | Nov. 11, 1919 |
| 2,343,672 | Hyler | Mar. 7, 1944 |
| 2,756,693 | Frost | July 31, 1956 |
| 2,786,428 | Arnold | Mar. 26, 1957 |